US011280374B2

(12) United States Patent
Lorenson et al.

(10) Patent No.: US 11,280,374 B2
(45) Date of Patent: Mar. 22, 2022

(54) JOINT ASSEMBLY

(71) Applicant: IMPULSE DOWNHOLE SOLUTIONS LTD., Edmonton (CA)

(72) Inventors: Troy Lorenson, Edmonton (CA); Kevin Leroux, Beaumont (CA); Dwayne Parenteau, Edmonton (CA)

(73) Assignee: IMPULSE DOWNHOLE SOLUTIONS LTD.

( * ) Notice: Subject to any disclaimer, the term of this patent is extended or adjusted under 35 U.S.C. 154(b) by 436 days.

(21) Appl. No.: 16/315,456

(22) PCT Filed: Jul. 7, 2017

(86) PCT No.: PCT/CA2017/050829
§ 371 (c)(1),
(2) Date: Jan. 4, 2019

(87) PCT Pub. No.: WO2018/006179
PCT Pub. Date: Jan. 11, 2018

(65) Prior Publication Data
US 2019/0309799 A1    Oct. 10, 2019

Related U.S. Application Data

(60) Provisional application No. 62/359,673, filed on Jul. 7, 2016.

(51) Int. Cl.
*F16D 3/18* (2006.01)
*F16D 3/20* (2006.01)
*F16D 3/50* (2006.01)

(52) U.S. Cl.
CPC .............. *F16D 3/185* (2013.01); *F16D 3/18* (2013.01); *F16D 3/20* (2013.01); *F16D 3/50* (2013.01)

(58) Field of Classification Search
CPC ... F16D 3/185; F16D 3/20; F16D 3/18; F16D 3/50
(Continued)

(56) References Cited

U.S. PATENT DOCUMENTS 1,128,430 A * 2/1915 Fetzer .................. F16D 3/20
1,231,249 A * 6/1917 Gardner ............... F16D 3/221
                                                        464/152
(Continued)

FOREIGN PATENT DOCUMENTS

FR          348.007      *  3/1905  ................... 464/152
GB          149504          8/1920
(Continued)

OTHER PUBLICATIONS

International Search Report dated Oct. 2, 2017 from PCT/CA2017/050829, 3 pgs.
(Continued)

*Primary Examiner* — Greg Binda
(74) *Attorney, Agent, or Firm* — Jenna L. Wilson; Wilson Lue LLP

(57) ABSTRACT

A joint assembly for use in transmitting torque comprises a ball and socket arrangement. The socket is comprised in a housing, and further comprises a key chamber with a substantially regular polygonal profile defining interior faces. The ball is provided on a ball stud component, and has a plurality of convexly curved facets. The ball is inserted in the socket with a plurality of keys, such that the keys are disposed between the ball facets and a corresponding interior face. Each key provides a bearing surface that mates with a corresponding facet, and a surface opposite the bearing surface to mate with the interior face. The sides of the key define a biconvex profile.

8 Claims, 10 Drawing Sheets

(58) Field of Classification Search
USPC .......................................................... 464/152
See application file for complete search history.

(56) References Cited

U.S. PATENT DOCUMENTS

| | | | |
|---|---|---|---|
| 1,300,541 A | | 4/1919 | Wolffgram |
| 4,549,872 A | * | 10/1985 | Kumpar .................. F16D 3/221 |
| 2007/0274770 A1 | | 11/2007 | Sagisaka et al. |
| 2010/0247232 A1 | | 9/2010 | Lin |

FOREIGN PATENT DOCUMENTS

| | | |
|---|---|---|
| GB | 967087 | 8/1964 |
| GB | 1170411 A | 11/1969 |
| WO | 2014/151518 A1 | 9/2014 |

OTHER PUBLICATIONS

Extended European Search Report dated Jan. 17, 2020 from EP 17823383.9, 7 pgs.
International Preliminary Report on Patentability dated Jan. 17, 2019, 6 pgs.
Examiner's Report dated Jan. 27, 2021 from EP 17823383.9, 5 pgs.

* cited by examiner

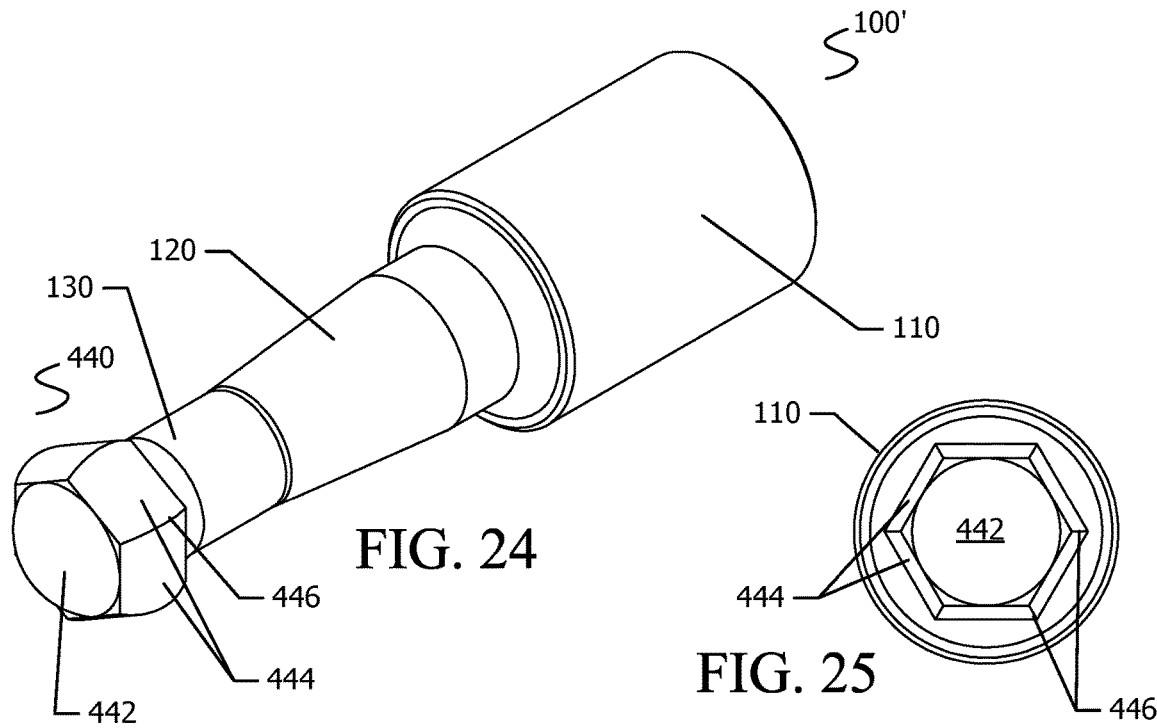
FIG. 24
FIG. 25
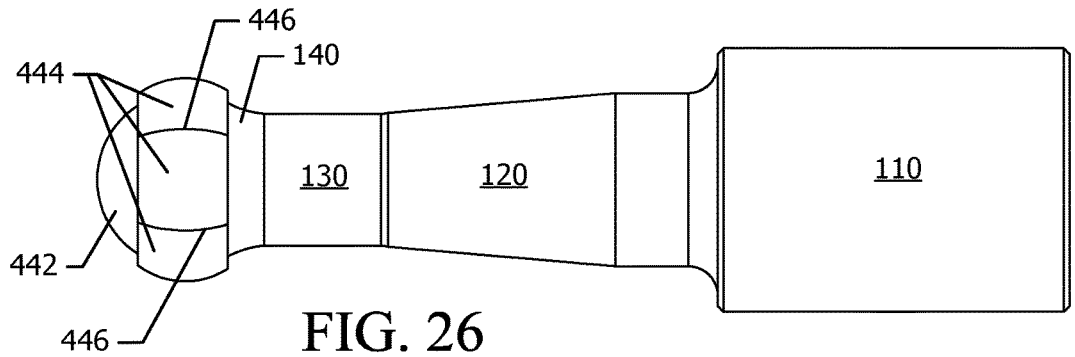
FIG. 26
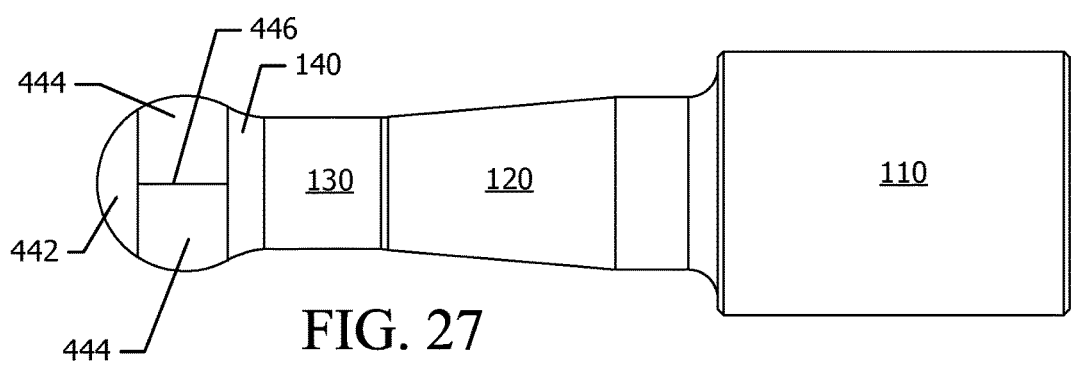
FIG. 27

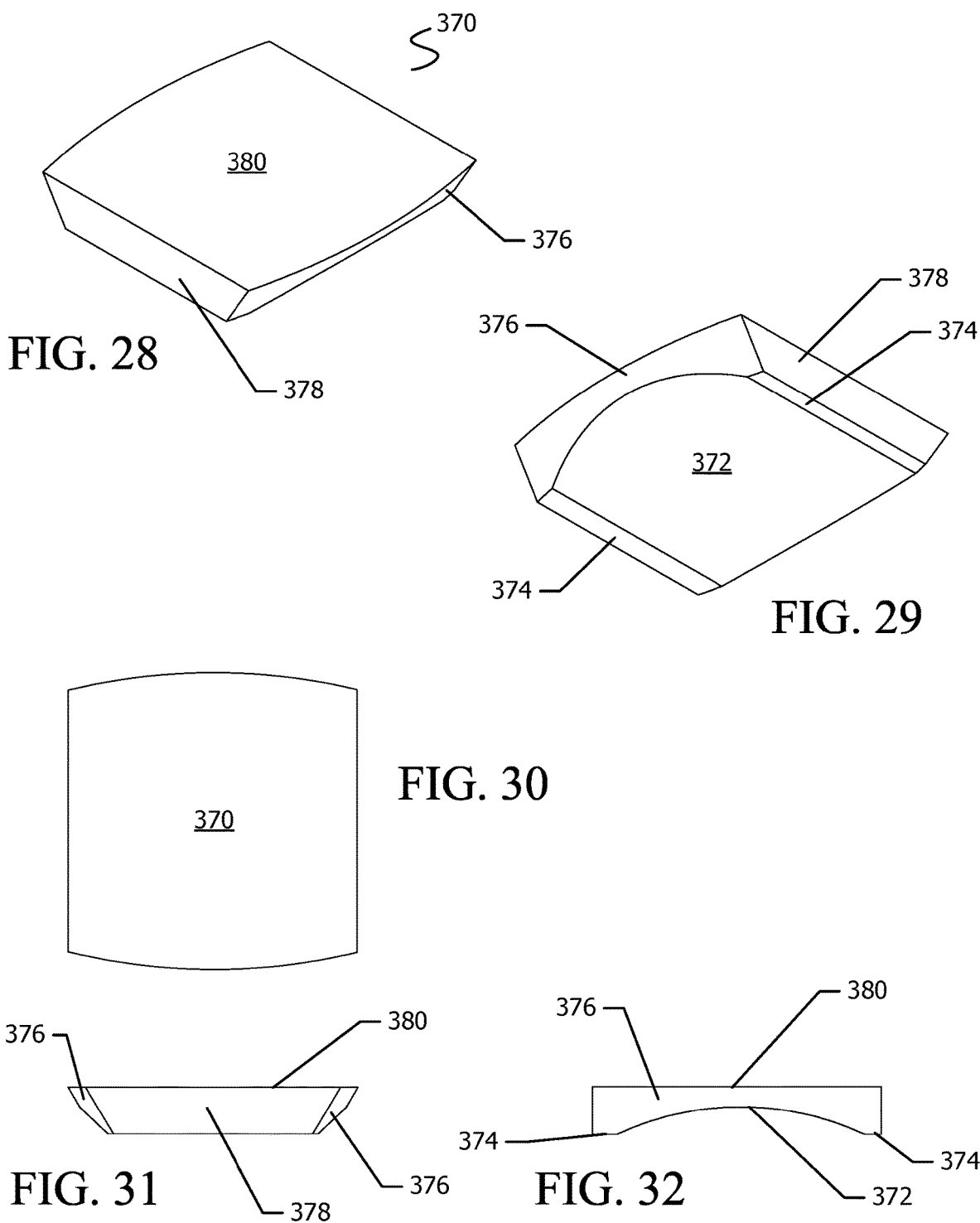

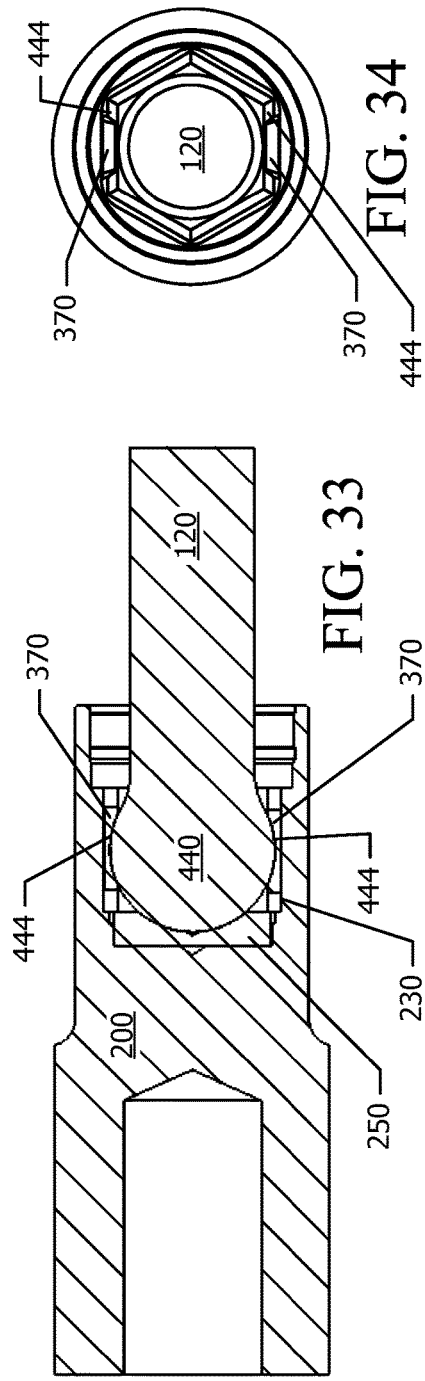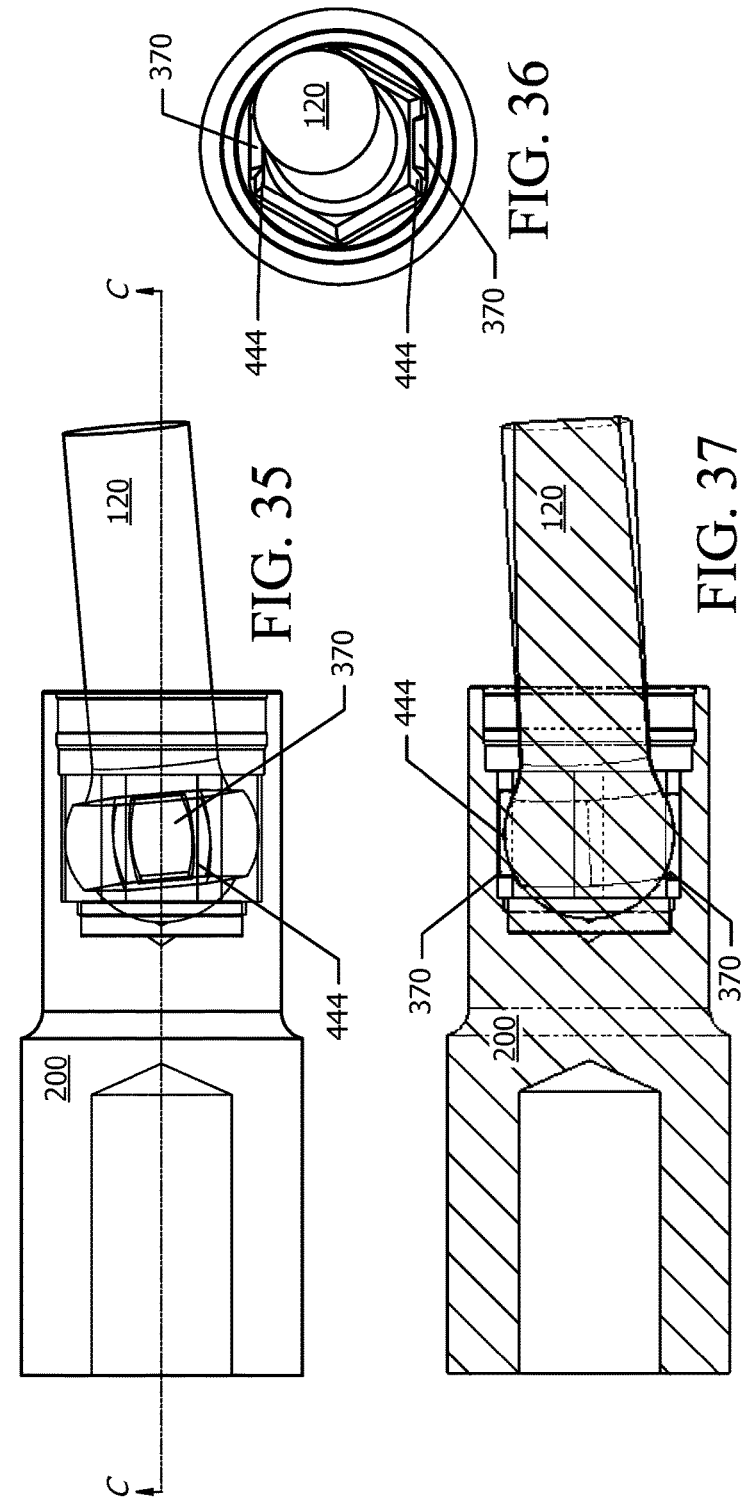

JOINT ASSEMBLY

CROSS-REFERENCE TO RELATED APPLICATIONS

This application is the National Stage of International Application No. PCT/CA2017/050829, filed Jul. 7, 2017, which claims the benefit of U.S. Provisional Application No. 62/359,673 filed on Jul. 7, 2016, the entirety of which is incorporated herein by reference.

TECHNICAL FIELD

The present disclosure relates to rotary joint assemblies.

TECHNICAL BACKGROUND

In machinery producing eccentric rotary output, suitable rotary joint assemblies, such as universal (Cardan) and constant velocity joints, are required to transmit torque from the rotor to linked components. For example, one form of conventional coupling comprises two parts, a ball and a seat. The surface of the ball and the interior of the seat are provided with cooperating grooves that define races. Steel balls ride in the races, such that torque is transmitted from the ball half of the coupling to the balls via the races in the ball surface, and the balls transmit torque to the seat half of the coupling via the races in the seat interior.

However, the configuration of this type of coupling may result in significant stress concentrated at points where the spherical ball and race are in contact, potentially resulting in material fatigue occurring well below the static drive strength of the coupling This problem may be mitigated by using higher-grade materials with greater hardness, but the stress at these contact points remain a potential point of failure.

BRIEF DESCRIPTION OF THE DRAWINGS

In drawings which illustrate by way of example only embodiments of the present disclosure and in which like reference numerals describe similar items throughout the various figures.

FIGS. 24, 25, 26, and 27 are perspective, front, top, and side elevation views, respectively, of a further embodiment a ball stud member of a joint assembly.

FIGS. 28 and 29 are first and second perspective views of a further embodiment of a key for use with the ball stud member of FIGS. 24-27.

FIGS. 30, 31, and 32 are top, side, and front elevation views, respectively, of the key shown in FIGS. 28 and 29.

FIG. 33 is a cross-sectional view of the key and a portion of the ball stud member of FIGS. 24-32 assembled in a housing member in a neutral position.

FIG. 34 is a rear view of the assembly shown in FIG. 33.

FIG. 35 is a sectional view of the key and a portion of the ball stud member of FIGS. 24-32 assembled in a housing member and positioned at an angled position.

FIG. 36 is a rear view of the assembly shown in FIG. 35.

FIG. 37 is a cross-sectional view of the assembly shown in FIG. 35 on a plane defined by line C-C.

DETAILED DESCRIPTION

A common design challenge in ball-and-socket or ball-and-cage joint design is that the balls, which transfer torque between joint components, are required to support a significant load. For example, in the adapter design discussed above, the load on the balls can result in stress concentrated on specific points in the spherical race and on the ball. This can result in the ball wearing down the surface of the race, creating divot or impression in the race surface, deformation of the ball, or both. It is generally understood in the art that the impact of the load during torque transfer can be mitigated by increasing the relative diameter of the balls; the larger the ball, the greater the potential bearing surface area available for distributing the load and transferring torque.

However, a limiting factor in joint design is the environment or assembly in which the joint is to be used. For example, in a drilling operation in a confined area, such as may occur in the oil and gas industry, the joint must fit within the internal diameter of a driveshaft housing, and must be compact enough so that any "wobbling" or precessional movement by the output end of the power section rotor does not physically interfere with the driveshaft housing. Similar size or clearance concerns may arise in any operation involving a linkage of eccentric rotational output to other components; the joint must not interfere, for example, with other parts of the assembly. Given this constraint on the size of a rotating joint, it may only be possible to use balls of larger dimension in a given environment or machine if neighboring components can be reduced in size so that the joint will still fit where needed. The trade-off, however, is that reducing the size (e.g., the cross-sectional area) of other components may reduce their strength and resistance to fatigue.

Accordingly, the embodiments described herein provide a ball and socket joint assembly utilizing a faceted ball end and a plurality of floating independent keys that provide increased bearing surface area for transmitting torque between the ball and socket portions of the assembly, while providing ball and socket components of sufficiently large thickness or cross-section.

Figure 1:
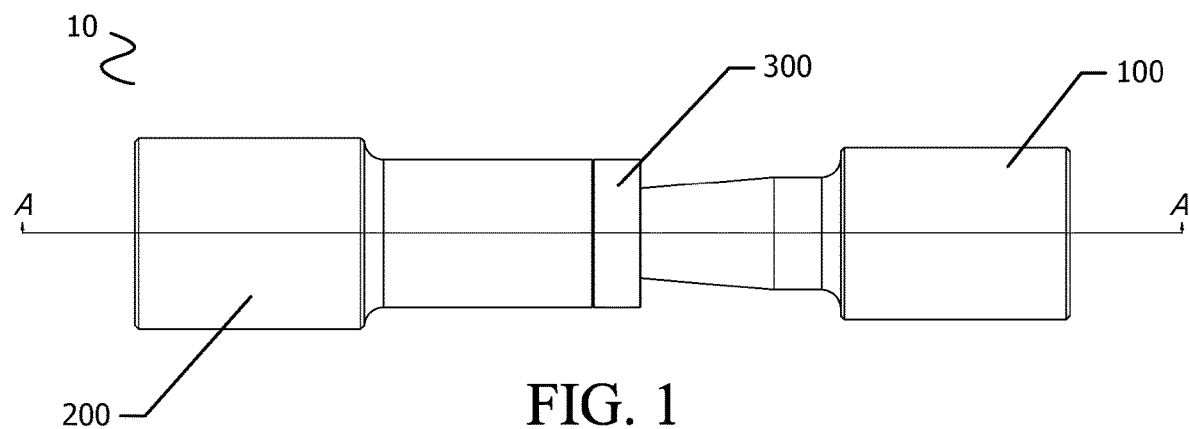
FIG. 1 is a side elevation view of a first embodiment of the joint assembly in a neutral position.
Figure 2:
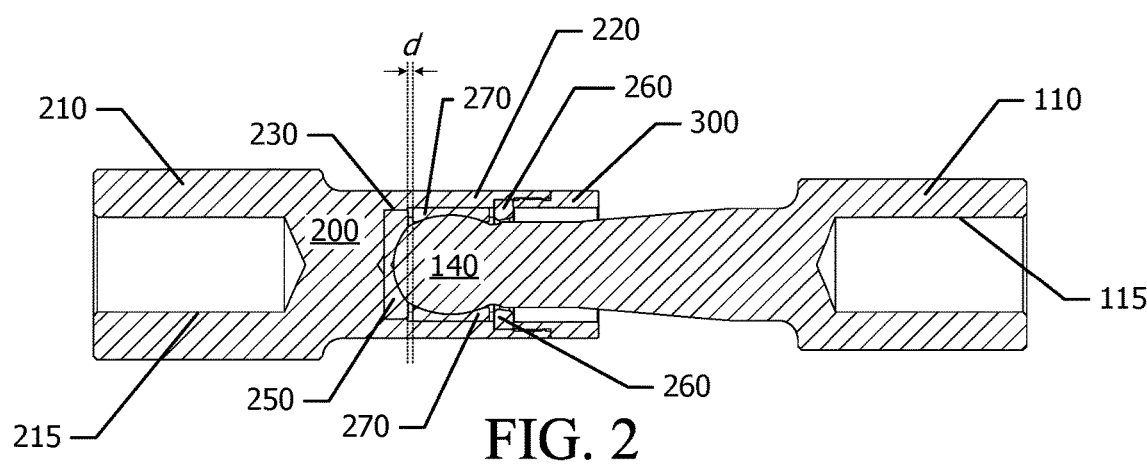
FIG. 2 is a cross-sectional view of the first embodiment of the joint assembly on a plane defined by line A-A in FIG. 1.
Figure 3:
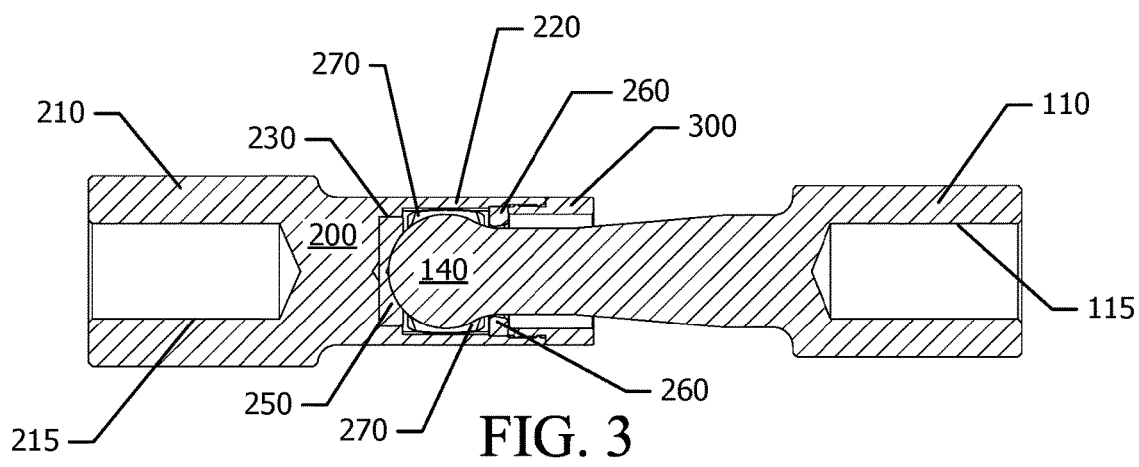
FIG. 3 is a cross-sectional view of the first embodiment of the joint assembly on the plane perpendicular to that in FIG. 2.

An example embodiment of a first example embodiment of a joint assembly is illustrated in the accompanying figures. As seen in FIGS. 1-3, the major components of this embodiment of the joint assembly 10 are a ball stud member 100 and a housing member 200. The ball stud member 100 includes a connector end 110, which can be adapted for connection to other components (for example, using a threaded bore 115). The ball stud member 100 terminates in a faceted engagement portion, here a ball end 140. The housing member 200 includes a connector end 210, which is adapted for connection to other components (again, as an example, with a threaded bore 215). The housing member 200 is also provided with a socket end 220 comprising a socket 230, which is shaped to receive a bearing 250 which rests within the socket 230, the ball end 140 of the ball stud member 100, and a plurality of keys 270 which are arranged around facets of the ball end 140. The bearing 250 is contoured to cooperate with the shape of the crown of the ball end 140, as can be seen in FIGS. 2 and 3. The interior faces of the keys 270 are likewise contoured to cooperate with the contoured facets of the ball end 140, which will be better appreciated with reference to FIGS. 7-9, discussed below. The ball stud member 100, housing member 200, keys 270, and bearing 250 can be formed of any material of suitable hardness, such as alloy steels and silicon carbide.

A boot 260 and collar 300 are fitted within or on the opening of the socket 230 to retain the keys 270 and ball end 140 in place within the socket, and to block debris from entering the portion of the socket 270 containing the keys 270. The threaded connections 115, 215 provided in the housing member 200 and ball stud member 100 are only example connections. Other connection means or adaptors may be provided on the housing and ball stud member 200, 100 for connection to other elements in a larger assembly. In an example implementation, the housing member 200 and ball stud member are manufactured of a high-strength alloy steel such as 4330V MOD, although the person skilled in the art will appreciate that other suitable materials can be employed. The keys 270 may be manufactured from a similar material.

Figure 4:
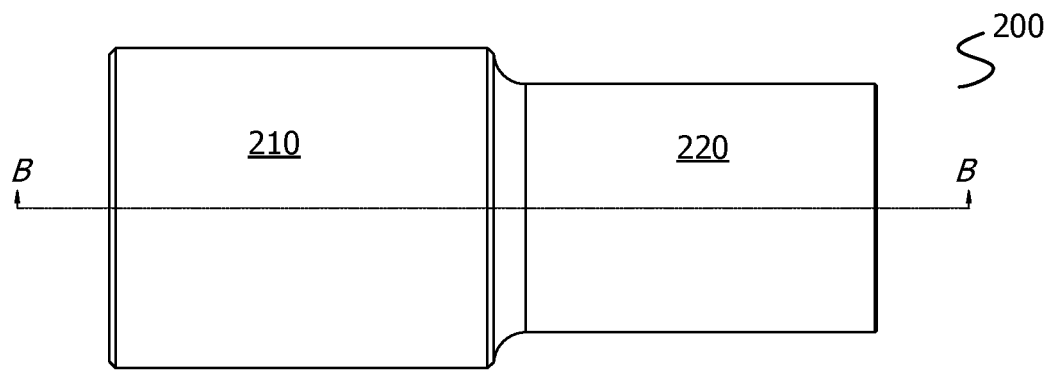
FIG. 4 is a side elevation view of a first embodiment of the housing member of the joint assembly of FIG. 1.
Figure 5:
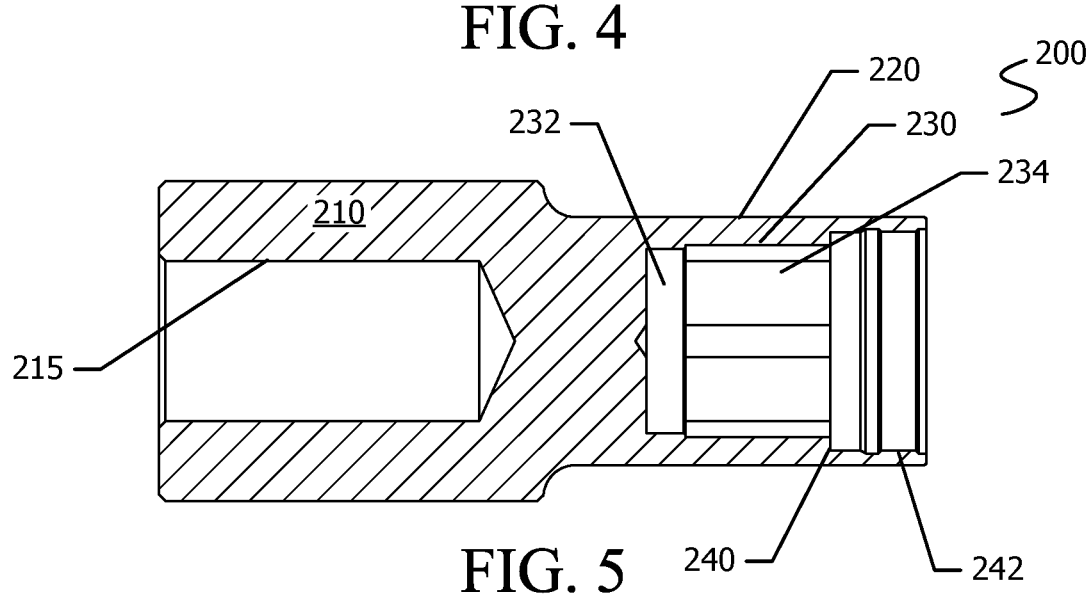
FIG. 5 is a cross-sectional view of the housing member of FIG. 5 on a plane defined by line B-B in FIG. 4.
Figure 6:
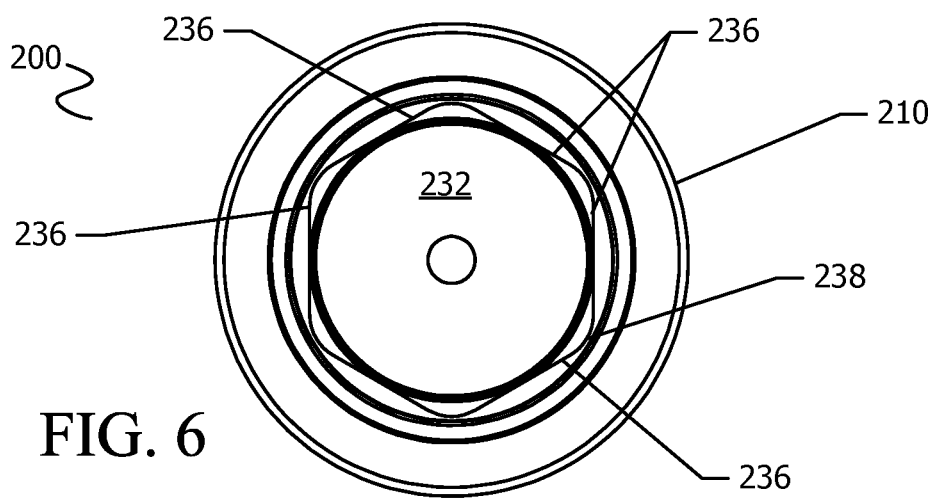
FIG. 6 is a front view of the housing member of FIG. 5 showing a socket end of the housing member.

Further details of the housing member 200 can be seen in FIGS. 4-6. The bottom portion of the socket 230 comprises a bearing seat portion 232, shaped to receive the bearing 250 (shown in FIGS. 2 and 3). Above the bearing seat portion 232, the socket 230 comprises a key chamber 234 which is dimensioned to receive the ball end 140 of the ball stud member surrounded by a plurality of keys 270. Above the key chamber 234, the socket 230 widens to provide an interior annular shoulder 240, which provides a seat for the boot 260 (as shown in FIGS. 2 and 3). The housing member 200 is also adapted to receive and retain the collar 300 using any appropriate connection means 242, such as a threaded connection.

In the illustrated example, the interior wall of the key chamber 234 defines a substantially polygonal cross-sectional area, as best seen in FIG. 6. In particular, the key chamber 234 of FIG. 6 has a substantially hexagonal profile, defined by wall segments 236 meeting at intersections 238. The intersections 238 are rounded with a selected radius of curvature that increases the wall thickness around the key chamber 234, thus increasing the strength of the housing 200 compared to a housing in which the wall segments meet at an angle. Each wall 236 provides a bearing surface for a corresponding key 270, as illustrated in FIGS. 2 and 3 and as explained below. In other implementations, the key chamber 234 may have another substantially regular polygonal profile (e.g., pentagonal, octagonal, etc.), or a substantially circular profile, with keys 270 appropriately sized and contoured to fit the walls of the key chamber 234.

Figure 7:
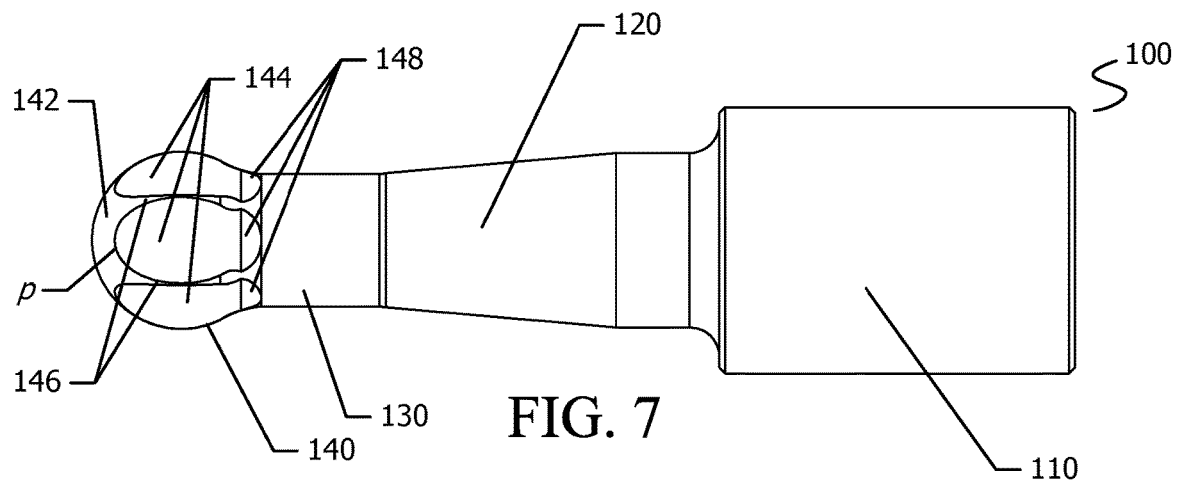
FIG. 7 is a side elevation view of a first embodiment of the ball stud member of the joint assembly.
Figure 8:
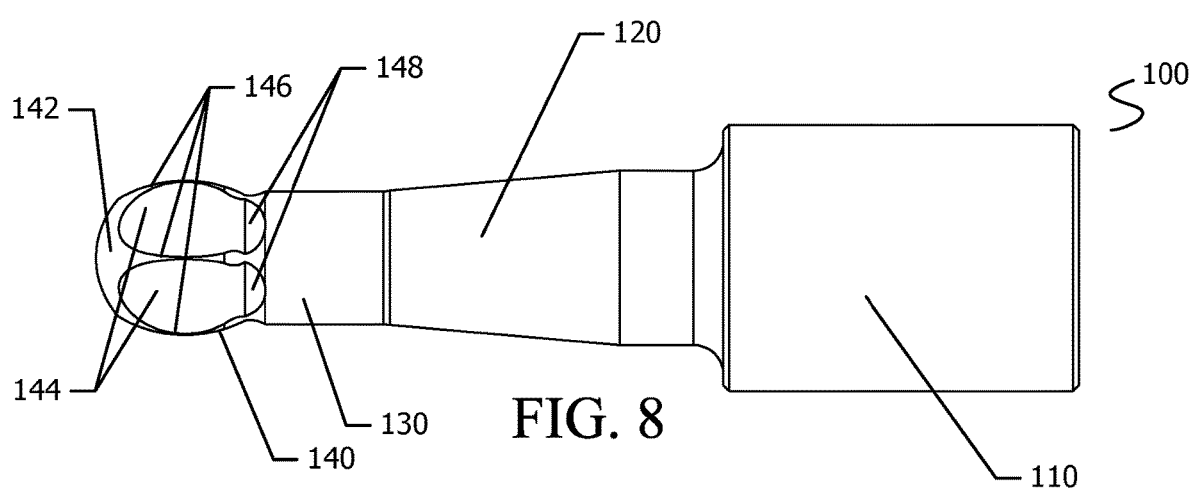
FIG. 8 is a top view of the ball stud member of FIG. 7.
Figure 9:
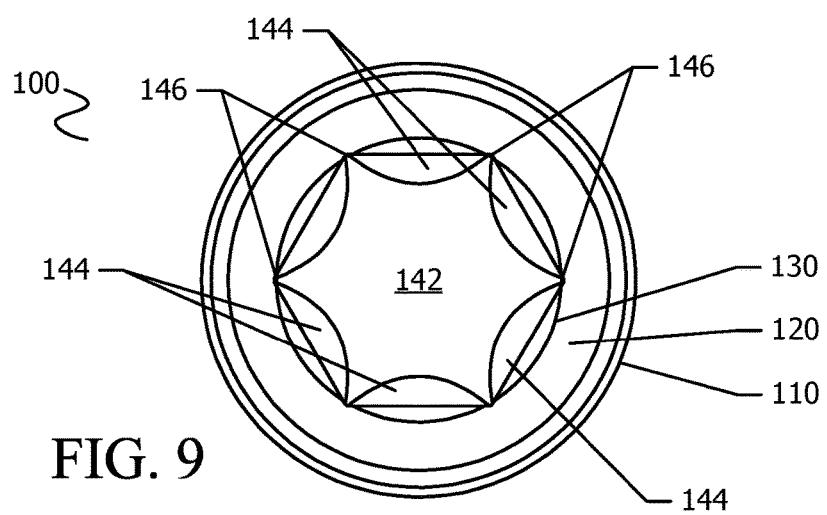
FIG. 9 is a front view of the ball stud member showing contours of a ball end of the ball stud member.
Figure 10:
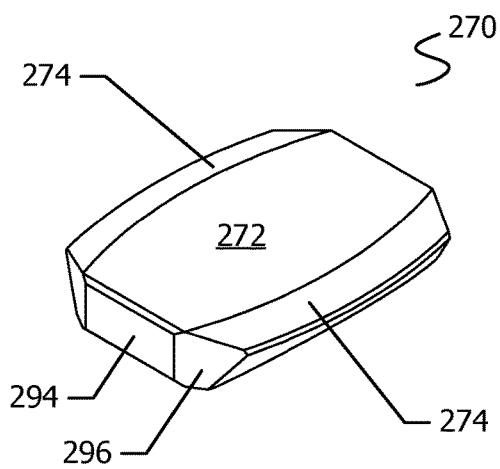
FIG. 10 is a perspective view of a first embodiment of the key of the joint assembly.
Figure 11:
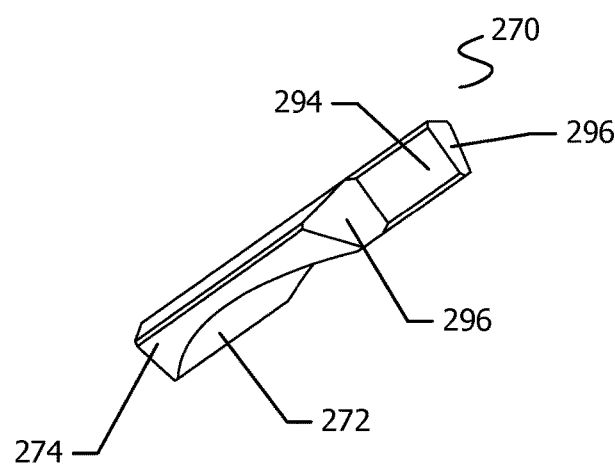
FIGS. 11 to 13 are auxiliary views of the key of FIG. 10.
Figure 12:
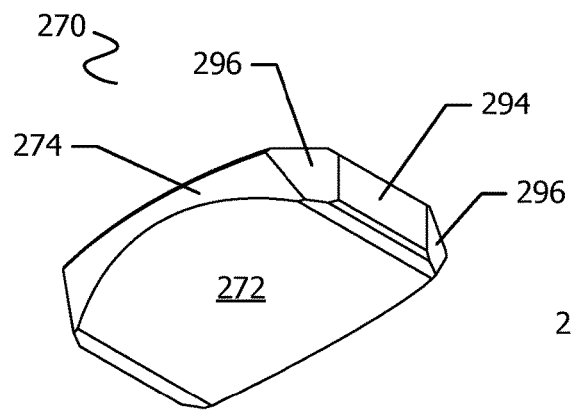
Figure 13:
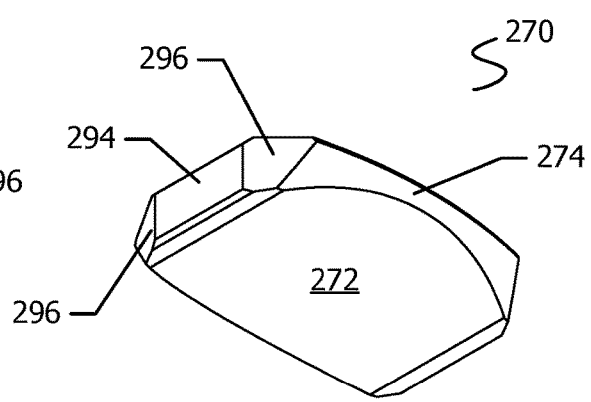
Figure 14:
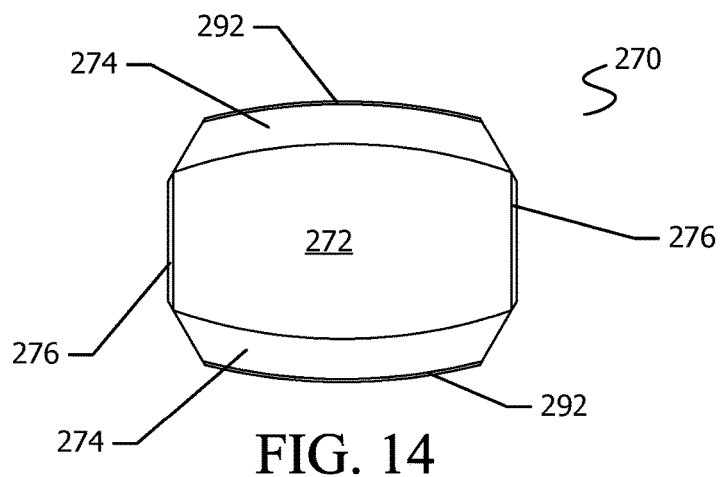
FIGS. 14, 15, 16, and 17 are top, side, front, and bottom views, respectively, of the key of FIG. 10.
Figure 15:
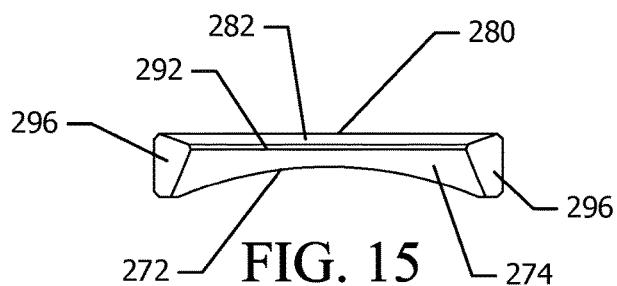
Figure 16:
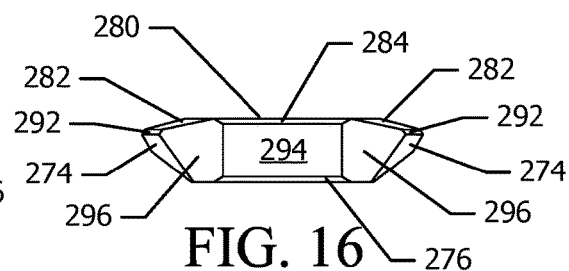
Figure 17:
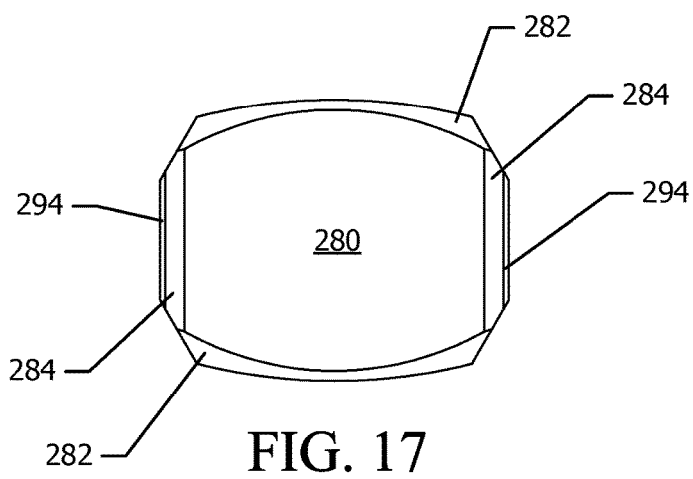

The ball stud member 100 is illustrated in further detail in FIGS. 7-9. A stud 120 extends from the connector end 110 to a neck portion 130 connecting the stud 120 to the ball end 140. The ball end 140 comprises a faceted ball having a number of contoured facets 144 extending between the neck portion 130 and the crown 142, arranged evenly around the circumference of the ball end 140, and separated by ribs 146. The general shape of the ball end 140 may be described as being defined by the intersection of multiple curved planes with a sphere, where the curved planes are arranged symmetrically around the sphere and have a radius of curvature greater than the radius of the sphere. Each facet 144 is convexly curved between the crown 142 and the neck portion 130; where the facet 144 meets the neck portion 130, the facet surface dimples in a concave curve 148, thus defining a section of the neck portion 130 of reduced diameter. The regions of the ball end 140 between the perimeters p of the facets 144 define the crown 142 and the ribs 146.

As can be seen in FIG. 9, while the surfaces of the facets 144 are curved in the latitudinal direction (i.e., from crown 142 to neck 130), they are substantially flat in the longitudinal direction, such that the ball end 140 will have a substantially polygonal cross-section between the crown 142 and the neck 130. The exterior surface of the ribs 146 may retain a slight longitudinal curvature. In the illustrated example, the ball end 140 has a substantially hexagonal cross-section defined by six facets 144 symmetrically arranged around the ball end 140; this hexagonal cross-section corresponds to the hexagonal profile of the key chamber 234 in the housing member 200.

The relative dimensions of the ball stud components, such as the ball end 140, neck portion 130, stud 120, connector end 110, the housing 200 and its connector end 210, and the interior of the socket 230, may be chosen based on the environment in which the joint assembly is to be used. For instance, if the joint assembly is to be used in a downhole drilling operation, the exterior diameters of the assembly may be determined by the space available inside a drilling string housing.

Figure 18:
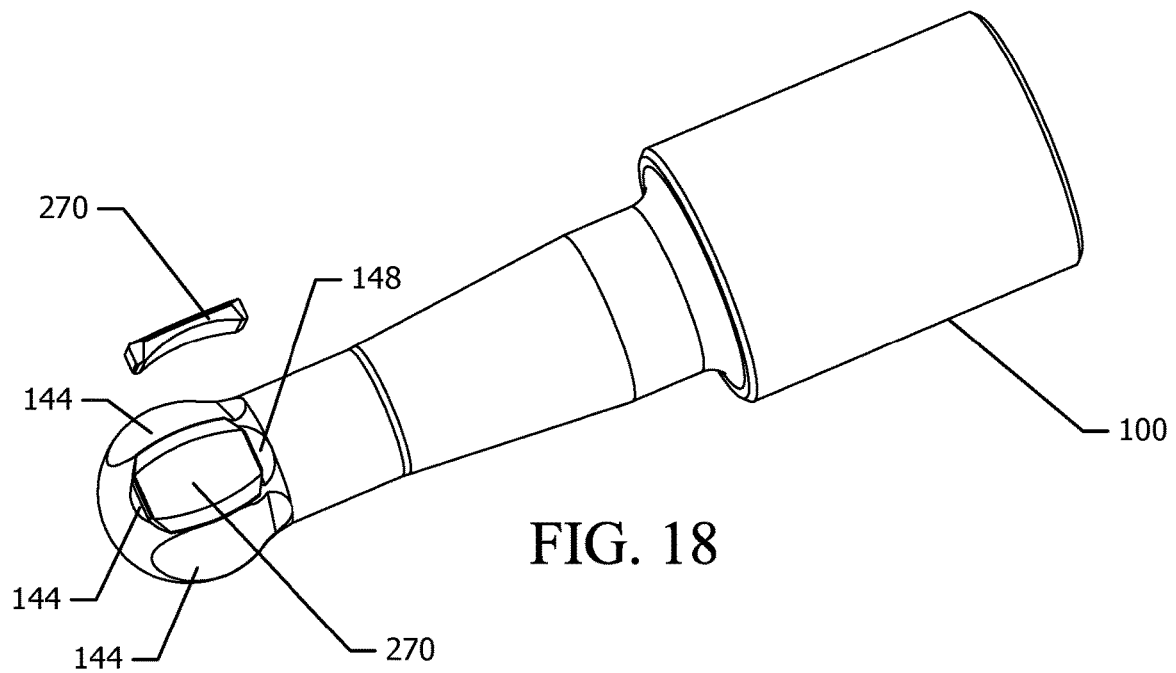
FIGS. 18 and 19 are perspective exploded views showing the relative orientation of the first embodiment of the ball stud member and select keys of the joint assembly.
Figure 19:
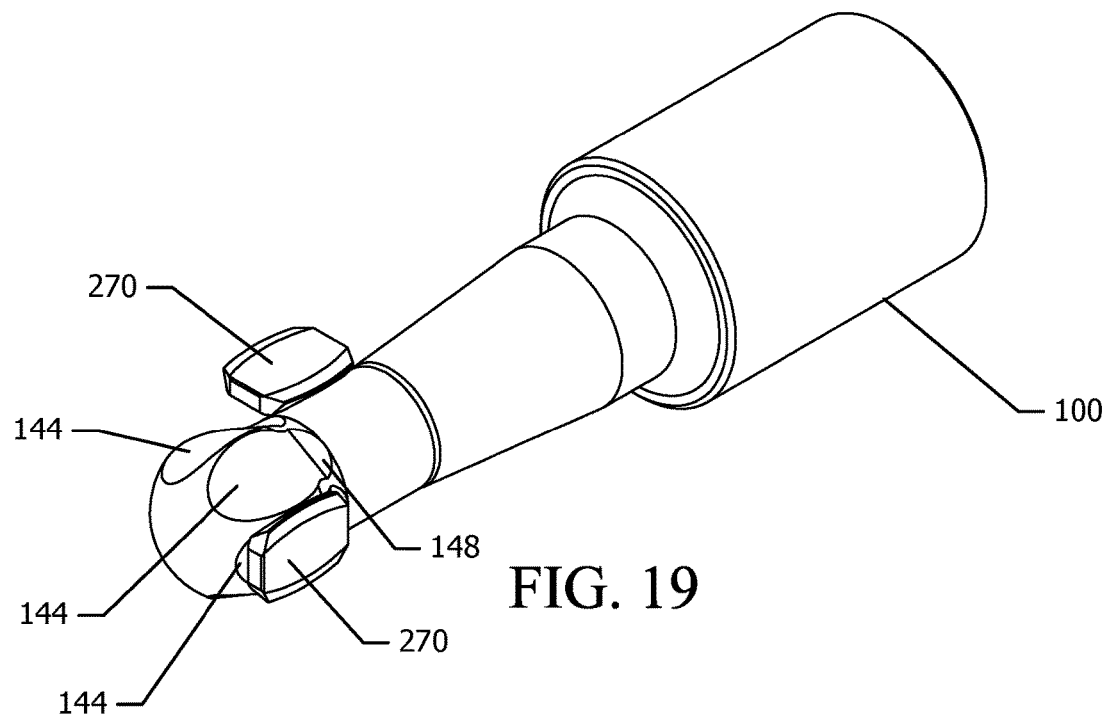

Each facet 144 of the ball end 140 is provided with a cooperating key 270. FIGS. 10-17 illustrate the configuration of a key 270 for use with the hexagonal profile ball end 140 and key chamber 234 illustrated in FIGS. 5-9. Each key 270 has a bearing surface 272 shaped to cooperate with a facet 144 of the ball end, and an opposing face 280 (best seen in FIG. 15) shaped to cooperate with a corresponding wall of the key chamber 234. In this example, the bearing surface 272 of the key 270 is concave along its length to cooperate with the convex curvature of the facets 144 shown in FIGS. 7-9. The cooperation between the key 270 and the ball end 140 can be more clearly seen in FIGS. 18 and 19, which illustrate how each key 270 can contact a corresponding facet 144 of the ball end 140.

The socket 230, keys 270, and ball end 140 are appropriately sized to permit movement of the keys 270 and ball end 140 within the socket 230 in response to changes in inclination of the ball end 140 (and consequently the ball stud member 100) with respect to the axis of the housing member 200. Thus, the keys 270 must be able to travel in an axial direction (i.e., parallel to the axis of the key chamber 234) along the interior walls 236 of the key chamber 234 during operation. Accordingly, the sides and ends of the key 270 are shaped to avoid mutual obstruction and contact with one another inside the key chamber 234. In the particular example illustrated here, the surfaces of the key 270 are bevelled to accommodate the interior shape of the key 234 and neighbouring keys 270. As can be seen in FIGS. 10-17, the bearing face 272 is set off by longitudinal 274 and transverse 276 bevelled faces, and the opposing face 280 is set off with corresponding longitudinal 282 and transverse 284 bevelled faces. The longitudinal bevelled faces 282, in particular, are curved such that the opposing face 280 is biconvex. The longitudinal bevelled faces 274, 282 meet contoured longitudinal edge faces 292 extending along the length of the key 270, and the transverse bevelled faces 276, 284 meet transverse edge faces 276 of the key 270. The corners of the key 270 are "clipped" and thus define angled faces 296. It will be appreciated by those skilled in the art that the bevelling of the faces of the key 270 need not be precisely as illustrated in this example, provided that the keys 270 are sized and shaped to permit travel of each key within the key chamber 234 without interfering with neighbouring keys 270.

To assemble the joint assembly 10, a bearing 250 is inserted into the socket 230 of the housing member 200 and seated on the bearing seat 232. The exposed surface of the bearing 250 is contoured to cooperate with the crown 142 of the ball end 140 of the ball stud member 100, as discussed above. The ball end 140 of the ball stud member 100, together with a plurality of keys 270 each having bearing faces 272 shaped to cooperate with the corresponding facets 144 of the ball end 140 and opposing faces 280 shaped to cooperate with the interior walls 236 of the key chamber 234, are inserted in the key chamber 234 and positioned against corresponding interior walls 236. The keys 270 are unattached to the housing member 200 and ball stud member 100, and each facet 144 of the ball end 140 is aligned with a corresponding bearing face 272 of a key 270. Lubricant can be applied to the interior of the socket 230 and/or to the keys 270 and ball end 140 during this assembly. In some implementations, the opposing surfaces 280 of the keys 270 and the interior wall segments 236 of the key chamber 234 can be dimpled to permit retention of lubricant between those components. The boot 260 is inserted and the collar 300 mounted in place to retain the bearing 250, keys 270 and ball end 140 within the socket 230. The connector ends 110, 210 of the ball stud member 100 and housing member 200 can be connected to other components of an apparatus.

Figure 20:
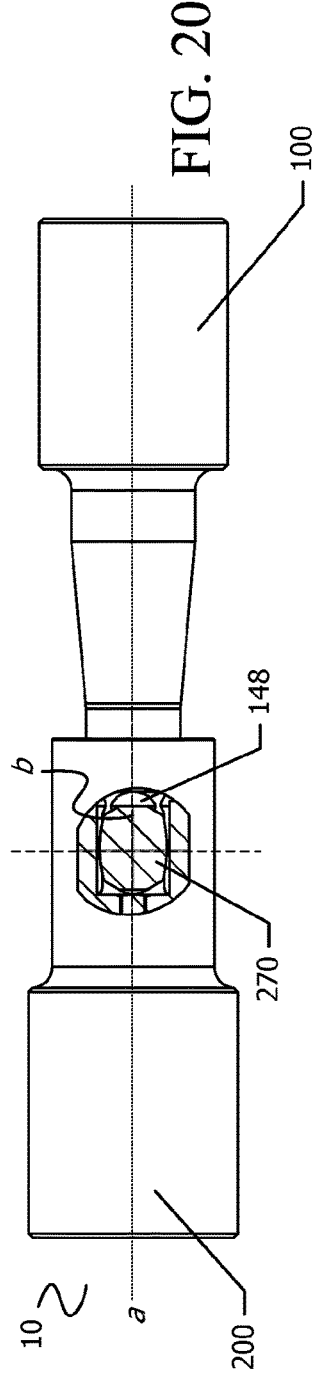
FIGS. 20 and 21 are sectional views showing the orientation of the first embodiment of the ball stud and keys within the housing member when the joint assembly is in a neutral and angled position, respectively.

FIGS. 1-13 and 20 illustrate views of the joint assembly 10 in a neutral position, when the ball stud member 100 is axially aligned with the housing member 200 (i.e., at an inclination of 0°). This is indicated in FIG. 20, which shows that the axis a of the housing member 200 is substantially aligned with the axis b of the ball stud member 100. As can be seen in the sectional view of FIG. 20, the keys 270 inside the key chamber 234 are also substantially aligned with the housing member axis a. In the neutral position, the keys 270 will all be in substantially the same axial position (subject to manufacturing or operational tolerances) with respect to the bearing 250, as indicated by distance d in FIG. 2.

Figure 21:
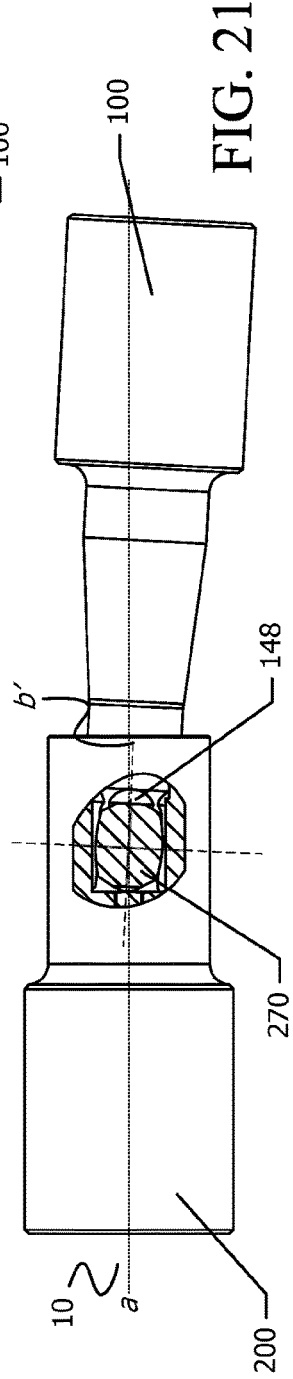
Figure 22:
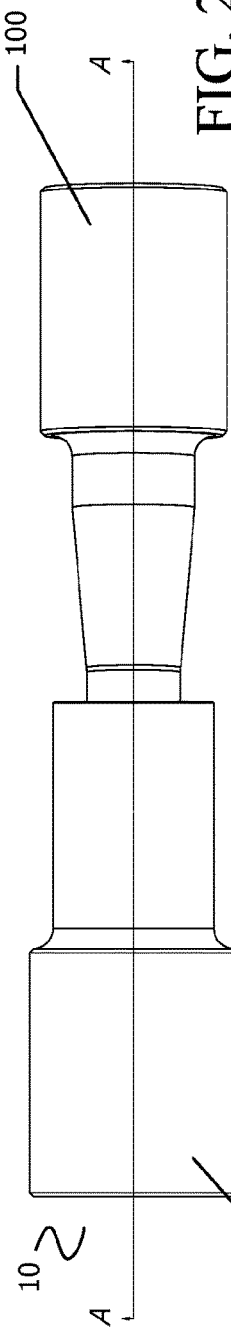
FIG. 22 is a side elevation view of the first embodiment of the joint assembly in the angled position of FIG. 21.
Figure 23:
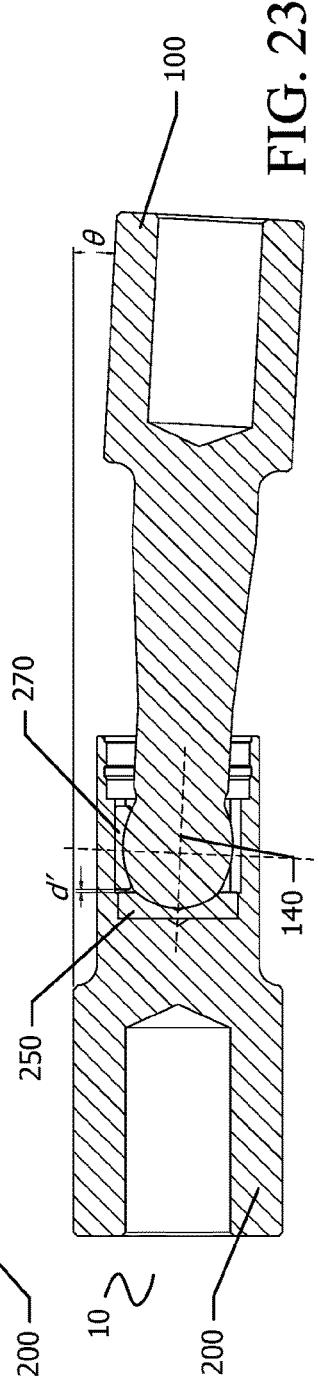
FIG. 23 is a cross-sectional view of the joint assembly of FIG. 22 on a plane defined by line A-A.

FIGS. 21-23 illustrate the joint assembly 10 in an off-axis (i.e., non-neutral) position, in which the ball stud member 100 is positioned at an inclination of θ (in the illustrated example, 3°) relative to the housing member 200, as indicated by the angular offset of the housing member axis a and the ball stud member axis b' shown in FIG. 21. As can be seen in the sectional view of FIG. 21, when the ball stud member 100 is inclined with respect to the housing member 200, the keys 270 may likewise be inclined with respect to the housing member 200 and in substantially alignment with the ball stud member axis 100, since the bearing surfaces 272 of the keys 270 are shaped to generally conform to the contours of the ball end facets 144. In addition, as can be better seen in the cross-sectional view of FIG. 23, when the ball stud member 100 is inclined with respect to the housing member 200, the lateral positions of the keys 270 will shift in response to the inclination, such that those keys 270 closer to the body of the ball stud member 100 shift away from the bearing 250 and the keys 270 farther away from the ball stud member 100 shift towards the bearing 250, as indicated by distance d' in FIG. 23. The clearance around the keys 270 and the ball end 140 within the socket 230 permits the ball stud member 100 to be inclined at the angle θ, while the interlocking bearing surfaces 272 of the keys 270 and the facets 144 permits torque to be transmitted between the housing member 200 and ball stud member 100. The range of θ will be determined by the amount of clearance available within the socket 230; to increase the clearance, and thereby extend the range of θ, one or more of the thickness of the keys 270 and the diameter of ball end 140 can be reduced, and/or the interior dimensions of the socket 230 increased.

Whether the joint assembly 10 is in a neutral or non-neutral position, as torque is applied to the ball stud member 100 (or, to the housing member 200, as the case may be), the facets 144 of the ball end 140 will engage with and exert force on the corresponding bearing surfaces 272 of the keys 270, thus transferring torque via the keys 270 between the ball stud member 100 and the housing member 200. The axial position of the keys 270 within the key chamber 234 will remain substantially constant during rotation of the ball stud member 140. Because the opposing faces 280 of the keys 270 are substantially flat and contact the corresponding substantially flat wall segments 236 of the key chamber, any stress on the keys 270 may be distributed over a larger area than in prior art universal joints employing ball bearings. In particular, with the biconvex opposing surface 280 illustrated here, any wear on the keys 270 due to contact between the keys 270 and the walls 236 of the key chamber 234 will follow the leading curved edge of the biconvex shape. Moreover, because the keys 270 shift within the key chamber 234 as the inclination of the ball stud member 100 changes, the wear locations on the interior of the key chamber 234 may shift accordingly, thus distributing wear patterns over a larger surface area. This may be contrasted with prior art hexagonal key designs in which a hex key with hexagonal cross section engages a socket with a corresponding hexagonal cross section, and the wear on the hex key as it rotates is concentrated on the leading edge of the hex key.

The configuration of the key chamber 234 and ball end 140 maximizes the use of the cross-sectional area of the joint assembly 10 so as to improve the overall strength of the assembly. The polygonal, chamfered design of the key chamber 234 provides additional wall thickness in the socket end of the housing member 200. This in turn reinforces the structure of the housing member 200. The wall thickness in the socket end can be further increased by altering the interior dimensions of the key chamber 234 with respect to the exterior diameter of the socket end (e.g., by reducing the width of the wall segments 236, and/or increasing the width of the chamfers) and altering the shape of the keys 270 and dimensions of the ball end 140 accordingly. It will be appreciated by those skilled in the art that while a hexagonal profile is provided in the illustrated examples, the key chamber 234, keys 270, and ball end 140 may be designed for another polygonal profile, as mentioned above. Different polygonal profiles will change the thickness profile of the socket end of the housing member.

FIGS. 24-37 illustrate a further embodiment of the joint assembly 10, and in particular a further embodiment of the ball stud member and key. This embodiment ball stud member 100' is shown in FIGS. 24-27. As can be seen in the perspective view of FIG. 24, the connector end 110, stud 120, and neck 130 of the ball stud member 100' can have substantially the same configuration as the connector end, stud, and neck of the first ball stud member embodiment 100. The ball end 440, however, is a substantially spherical ball at the end of the neck 130 contoured by a series of abutting facets 444. Like the facets 144 of the first embodiment, the facets 444 consist of convexly curved surfaces extending between a rounded crown 442 and the neck 130 of the ball stud member 100'. The facets 444 are, again, substantially symmetrically arranged around the side of the ball end 440, and are defined as curved planes having a radius of curvature greater than that of the sphere forming the underlying shape of the ball end 440. In this embodiment, however, the facets 444 abut each other longitudinally, meeting at edges 446. As can be seen in the front view of FIG. 25, the six facets 444 in this example thus define a hexagonal profile for the ball end 140. FIGS. 26 and 27 illustrate top and side views of the ball stud member 100', showing the protrusion of the faceted surfaces from the ball end 440.

The corresponding key 372 to be used in this embodiment is illustrated in FIGS. 28-32. Each key 372 has, again, a bearing surface 372 and an opposing surface 380. The bearing surface 372 adjoins upper and lower transverse bevels 374, and is concavely curved to substantially complement the contour of a facet 444. The bearing and opposing surfaces 372, 380 extend to meet a longitudinal, contoured face 376 on either side. The longitudinal faces 376 extend along the length of the key 372. The contour of the longitudinal faces thus provides the key 372, and the opposing surface 380 in particular, with a substantially biconvex shape. The transverse bevels 374 and the opposing surface 372 also meet a transverse face 378, which in this example is substantially flat.

FIGS. 33-37 illustrate a portion of the assembled joint assembly. The joint assembly can be assembled in substantially the same manner as the previously described embodiment, with a corresponding key 372 fitted to each facet 444 of the ball end 440, and variations discussed above (e.g., dimpling) may be included in this embodiment. The housing member 200 in this example can be the same, or substantially similar, to the housing member 200 described above; in this example, since there are six facets 444 protruding from the ball end 440, the socket 230 is likewise provided with a hexagonal profile as in the previous embodiment. FIG. 33 illustrates the assembly in a neutral position—that is to say, the stud 120 is axially aligned with the housing member 200. FIG. 34 shows a rear view of the assembly, viewed from the stud end of FIG. 33. Not all keys 370 are illustrated in the accompanying figures for ease of reference.

When the ball end 440 and the rest of the ball stud assembly is at an incline with respect to the housing 200, the keys 370 will also rotate accordingly based on their position with respect to the incline. As can be seen in FIG. 35, for example, those keys that are lying in a plane substantially parallel to the plane of the angle of inclination (in FIG. 35, perpendicular to the plane defined by C-C) will be inclined by the same angle of inclination within the socket 230, as shown by the illustrated key 370 in FIG. 35. The key 370 moves the same amount as the stud 120 because its bearing surface is contoured to match its corresponding facet 444. The key 370 is able to rotate against its corresponding interior wall of the socket 230 because the contoured longitudinal edge provides the opposing surface 380 with its biconvex shape, which is tapered at its upper and lower ends to provide clearance for the key 370 to rotate against the interior wall. FIG. 37 is a cross-sectional view of the assembly of FIG. 36, including a cross-section of the key 370 illustrated in FIG. 36. Other keys 370, such as those particular keys illustrated in the rear view of FIG. 36, will rotate against the interior wall of the socket 230 to a lesser degree.

It will be appreciated by those skilled in the art that the joint assemblies described above can be applied to downhole drilling operations, such as directional drilling requiring the use of bent subs or other components designed to angle the drill string in a given direction. The connector ends 110, 210 of the ball stud and housing members 100, 100', 200 can be adapted for connection to downhole components such as the power section rotor and bearing assembly, and/or additional driveshaft components. In addition to transferring torque, the joint assembly 10 permits the transfer of thrust load through the crown 142 or 442 of the ball end 140 or 440 and bearing 250 in the housing member 200. However, it will also be appreciated that the joint assembly can be used in a variety of other applications requiring a joint capable of transmitting torque with appropriate adaptations to provide connections to other components of the assembly. Example applications include use in motor vehicles with independent suspensions, and heavy equipment or conveyor systems producing high torque at low speeds. Nothing in this disclosure should be considered as limiting to any particular application.

Throughout the specification, terms such as "may" and "can" are used interchangeably and use of any particular term in describing the examples and embodiments should not be construed as limiting the scope or requiring experimentation to implement the claimed subject matter or subject matter described herein. Various embodiments of the present invention or inventions having been thus described in detail by way of example, it will be apparent to those skilled in the art that variations and modifications may be made without departing from the invention(s). The inventions contemplated herein are not intended to be limited to the specific examples set out in this description. The inventions include all such variations and modifications as fall within the scope of the appended claims.

The invention claimed is:

1. A joint assembly, comprising:
    a housing member comprising a socket, the socket comprising a key chamber having an interior surface;
    a ball stud member comprising a ball end on a neck portion, the ball end comprising a plurality of convexly curved facets extending between a rounded crown portion and the neck portion, the ball stud member being disposed in the socket, wherein torque is transmittable between the ball stud member and the housing member via the concavely curved bearing surfaces and the convexly curved facets and thrust is transmittable between the ball stud member and the housing member via the crown portion; and
    a plurality of keys disposed between the ball end and the interior surface, each key of the plurality of keys comprising a concavely curved bearing surface adapted to mate with a corresponding facet of the plurality of convexly curved facets and an opposing surface adapted to mate with the interior surface, each of the plurality of keys being unattached to the housing member and movable in an axial direction of the housing member within the socket in response to changes in inclination of the ball end with respect to an axis of the housing member.

2. The joint assembly of claim 1, wherein the key chamber has a substantially regular polygonal profile, and the interior surface comprises a plurality of interior wall segments.

3. The joint assembly of claim 2, wherein the substantially regular polygonal profile is a substantially hexagonal profile.

4. The joint assembly of claim 3, wherein the opposing surface of each key is biconvex.

5. The joint assembly of claim 1, wherein each key of the plurality of keys is bevelled to thereby avoid mutual obstruction or contact with other keys of the plurality of keys.

6. The joint assembly of claim 5, wherein the bearing surface is set off by longitudinal and transverse bevelled faces and the opposing surface is set off with corresponding longitudinal and transverse bevelled faces.

7. The joint assembly of claim 5, wherein the bearing surface is set off by transverse bevelled faces and the bearing and opposing surfaces meet a longitudinal, contoured face on either side, and the transverse bevelled faces and the opposing surface also meet a transverse face on either side.

8. The joint assembly of claim 1, further comprising a bearing disposed in the socket and receiving the crown portion, thrust being transmittable between the ball stud member and the housing member via the crown portion and the bearing.

\* \* \* \* \*